United States Patent [19]

Shuto

[11] 4,246,986
[45] Jan. 27, 1981

[54] CURRENT COLLECTION SYSTEM FOR TRAVELLING BODY

[75] Inventor: Masamoto Shuto, Tokyo, Japan
[73] Assignee: Japan Air Line Co., Ltd., Tokyo, Japan
[21] Appl. No.: 65,745
[22] Filed: Aug. 10, 1979
[30] Foreign Application Priority Data Aug. 15, 1978 [JP] Japan ................................. 53-99242

[51] Int. Cl.³ .............................................. B60M 1/34
[52] U.S. Cl. ................................ 191/29 R; 191/49
[58] Field of Search ........... 191/29 R, 29 DM, 30-32, 191/45 R, 49

[56] References Cited
U.S. PATENT DOCUMENTS

| 3,790,725 | 2/1974 | Charamel | 191/29 R |
| 4,155,434 | 5/1979 | Howell | 191/45 R |

Primary Examiner—Richard A. Schacher
Attorney, Agent, or Firm—Wenderoth, Lind & Ponack

[57] ABSTRACT

A current collection system for a travelling body comprising main rigid trolley rails continuously arranged one after another in the direction of the track of the travelling body; an auxiliary rigid trolley rail which is arranged between the confronting ends of the adjacent main rigid trolley rails and which has one end thereof supported at a fixed support point and the other end thereof supported at a movable support point; a pair of contactor-carrying plates which are attached to the travelling body and are arranged to have said main and auxiliary rigid trolley rails held between the pair of the plates; and two pairs of contactors which are arranged to press each of the main and auxiliary trolley rails on both sides thereof separately from each other. These pairs of contactors are arranged to come into contact alternately with the main and auxiliary rigid trolley rails while the travelling body is on the move. Meanwhile, at least one end of the auxiliary trolley rail is formed to have tapered faces and thus to have a gradually decreasing width for smooth transition of the contact of the contactors with the trolley rails from the main trolley rail to the auxiliary trolley rail, and vice versa.

5 Claims, 5 Drawing Figures

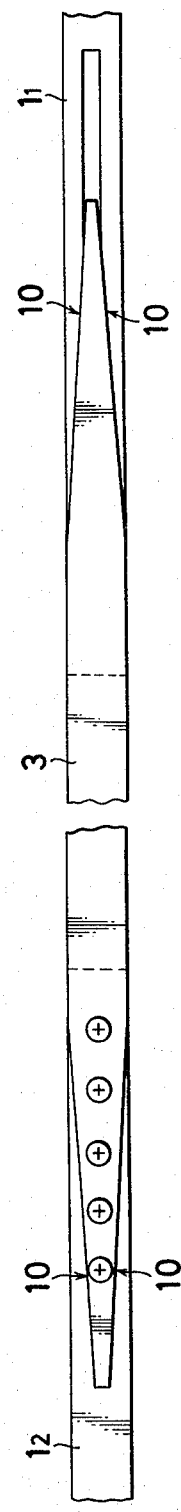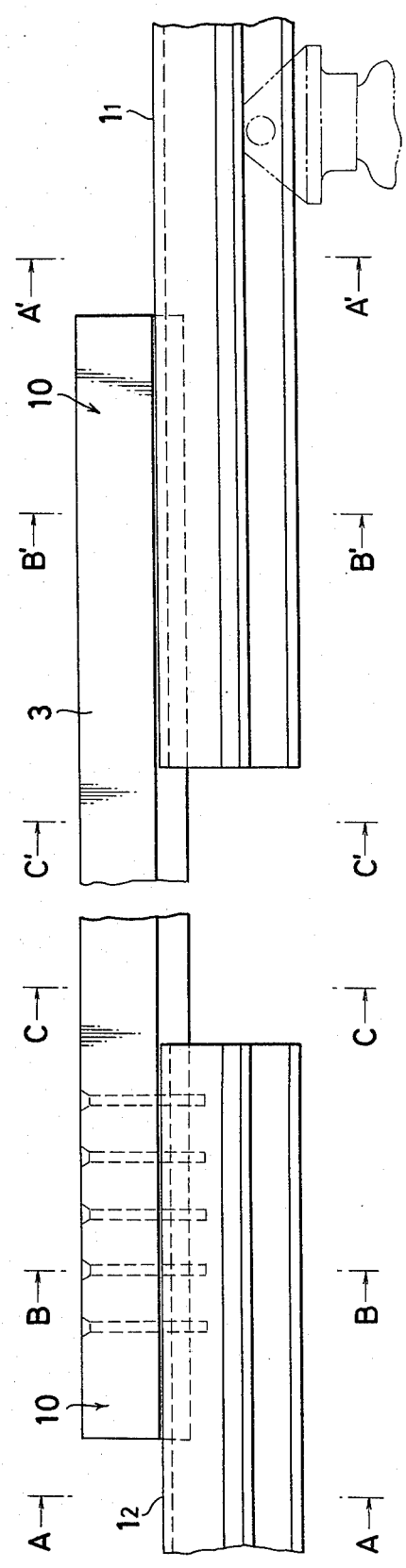

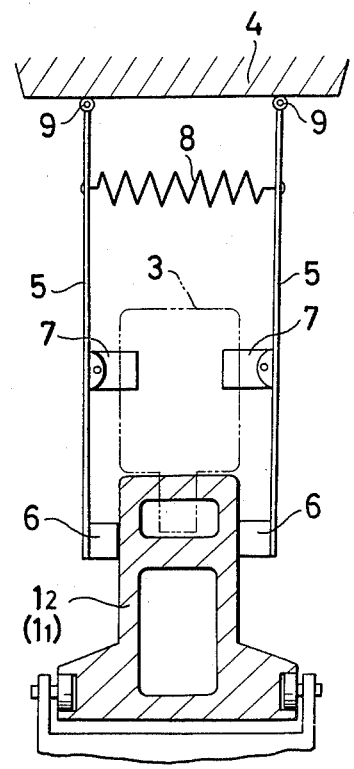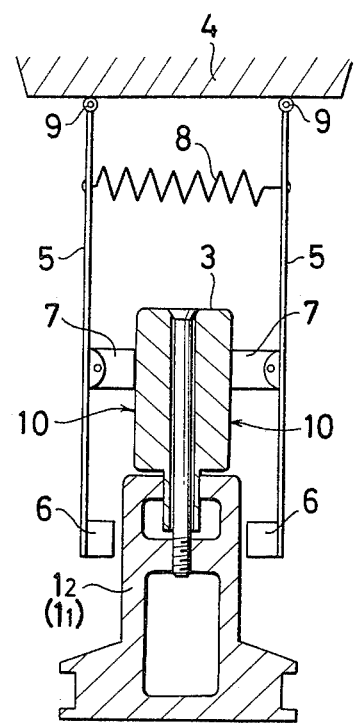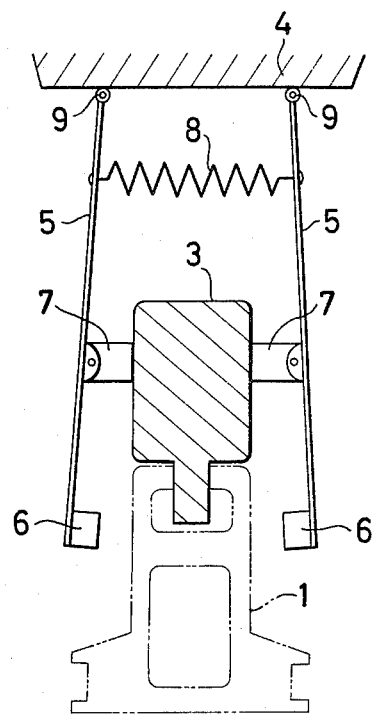

CURRENT COLLECTION SYSTEM FOR TRAVELLING BODY

BACKGROUND OF THE INVENTION

1. Field of the Invention

This invention relates to a current collection system for supplying an electric power to a travelling body and particularly to a high speed travelling body such as a linear motor car or the like.

2. Description of the Prior Art

Heretofore, current collection systems of the type having rigid trolley rails (hereinafter will be called a trolley rails for short) which are continuously arranged one after another and arranged to be held between a pair of current collecting contactors (hereinafter will be called contactors) of a current collector which is attached to a travelling body have been popularly used and particularly for high speed travelling bodies.

However, in view of the expansion and contraction of the trolley rail which take place with variation in temperature in the direction of the track, it is absolutely necessary to provide a certain given degree of gap between trolley rails to be continuously arranged one after another. Therefore, the current collection system of this type necessitates a thorough study to solve a problem that arises when the travelling body passes over such gap parts. In other words, the travelling body frequently passes over the gap parts where the travelling body is used to travel at a high speed and it is important to ensure continuation of current collection and effective prevention of contactors from being damaged. The present invention is directed to the solution of this problem.

SUMMARY OF THE INVENTION

It is an object of this invention to provide a current collection system for a travelling body comprising main rigid trolley rails continuously arranged one after another in the direction of the track of the travelling body; an auxiliary rigid trolley rail which is arranged between and over the confronting ends of adjacent main rigid trolley rails in their continuous arrangement and which has one end thereof supported fixedly while the other end thereof is movably supported, a pair of contactor-carrying plates which are attached preferably pivotally to the travelling body and are arranged to have said main and auxiliary rigid trolley rails positioned therebetween, and two pairs of opposing contactors provided on the insides of the plates which are arranged to contact respectively the main and auxiliary trolley rails on both sides, at least one pair of these pairs of contactors being arranged to come into contact with their corresponding trolley rail when the travelling body is running.

It is another object of this invention to provide a current collection system for a travelling body in which at least one end of the auxiliary trolley rails is formed to have tapered faces as necessary and thus to have a gradually decreasing width for smooth transition of the contact of the contactors with the trolley rails from the contact with the main trolley rail to the contact with the auxiliary trolley rail, and vice versa.

These and other objects, advantages and features of the invention will be understood from the following description of an embodiment thereof when read in connection with the accompanying drawings.

BRIEF DESCRIPTION OF THE DRAWINGS

All of the accompanying drawings illustrate an embodiment of the invention.

FIG. 1 is a plan view showing a joint between main trolley rails.

FIG. 2 is a front view of the same joint.

FIG. 3 is a sectional view taken on line A—A or line A'—A' of FIG. 2.

FIG. 4 is a sectional view taken on line B—B or B'—B' of FIG. 2.

FIG. 5 is another sectional view taken on line C—C or C'—C' of FIG. 2.

DETAILED DESCRIPTION OF PREFERRED EMBODIMENT

In the accompanying drawings, reference numerals $1_1$ and $1_2$ indicate main trolley rails which are continuously arranged along a track. Between the confronting adjacent ends of these main trolley rails $1_1$ and $1_2$, there is provided a gap 2. An auxiliary trolley rail 3 is arranged at each gap part 2 to straddle the adjacent main trolley rails $1_1$ and $1_2$ in parallel therewith. One end of the auxiliary trolley rail 3 is fixed to one main trolley rail $1_1$ and the other end thereof is slidably carried by the other main trolley rail $1_2$ to be slidable in the direction of the track. Therefore, when the length of the gap 2 increases or decreases due to expansion or contraction of the main trolley rails $1_1$ and $1_2$, the change in the length of the gap 2 can be absorbed by the sliding movement of the auxiliary trolley rail 3 over one of the main trolley rails.

A reference numeral 4 indicates a travelling body which travels afloat along the track. The travelling body is arranged, for example, to be set afloat by an electromagnetic force from a rail laid on the ground and to travel by a driving force of a linear motor. This travelling body 4 is provided with a current collector. The collector comprises a pair of contactor-carrying plates 5 which extend downward from the travelling body 4 and are arranged to confront each other to hold the above stated main and auxiliary trolley rails $1_1$, $1_2$ and 3 between them; two pairs of contactors 6 and 7 which are secured to the contactor-carrying plates 5 and each pair of which is separately disposed from the other pair, one pair being arranged in the upper positions and the other pair in the lower positions to be in pressed contact with the main and auxiliary trolley rails $1_1$, $1_2$ and 3 independently of each other; and a tension spring 8 which is disposed between these contactor-carrying plates 5. Each of these contactor-carrying plates 5 is pivotally held by the travelling body 4 and the pair of plates 5 are thus arranged to be capable of spreading open their lower ends. The auxiliary trolley rail 3 is formed to have the width of its two end parts gradually decrease into tapered faces 10. The current collection system which is arranged as described in the foregoing operates as shown below:

When the current collector of the travelling body 4 is in the position as represented by the line A—A in FIG. 2 and as shown in FIG. 3, the lower pair of the contactors 6 of the two pairs of the contactors are in pressed contact with the main trolley rail $1_2$ on the two sides thereof while the upper pair of contactors 7 are in an open state (non-contacting state). Then, when the travelling body 4 moves to come into a position as represented by the line B—B or as shown in FIG. 4 and further to come into another position as represented by the line C—C or as shown in FIG. 5, the upper pair of contactors 7 gradually come into contact with the auxiliary trolley rail 3 along the tapered face 10. This causes the lower ends of the pair of contactor carrying plates 5 to spread out to release the lower pair of contactors 6 from engagement with the main trolley rail. The engagement relation between the contactors and the trolley rails then changes to other relations one after another in converse order as shown at the points indicated by the lines C'—C', B'—B' and A'—A' according as the travelling body further moves and the lower contactors 6 come to engage with the next main trolley rail $1_1$. The alternate engagement and disengagement with and from the main and auxiliary trolley rails are thus repeated to continuously effect current collection.

Further, it goes without saying that smooth change-over of the engagement of the two pairs of contactors between engagement with the main trolley rail and engagement with the auxiliary trolley rail may be effected not only by the above stated arrangement to form the auxiliary trolley rail to have tapered end faces but also by some other suitable arrangement.

As described in the foregoing, the invented current collection system for a travelling body is advantageous and particularly effective when it is applied to a high speed travelling body that is arranged to travel over a long track. In accordance with the invention, the adjacent confronting ends of the main trolley rails also can be allowed to have a larger gap between them to give a great advantage in the practical application of the invention.

What is claimed is:

1. A current collection system for a travelling body comprising in combination:

(a) main trolley rails continuously arranged one after another in the direction of the track of the travelling body;
   (b) an auxiliary trolley rail which is arranged between and over confronting ends of adjacent main trolley rails in said continuous arrangement of the main rigid trolley rails, one end of said auxiliary rigid trolley rail being supported fixedly while the other end thereof being movably supported on the main trolley rail, and
   (c) a pair of contactor carrying members which are attached to said travelling body and extend downward, each of said pair of contactor carrying members having a main contact element for contacting with the main trolley rail and an auxiliary contact point for contacting with the auxiliary trolley rail.

2. A current collection system for a travelling body according to claim 1, wherein at least one end of the auxiliary trolley rail is formed to have a tapered face on its side.

3. A current collection system for a travelling body according to claim 1, in which the pair of contactor supporting members are connected by a spring therebetween.

4. A current collection system for a travelling body according to claim 1, in which the protruding length of the main contact element from the contact supporting member is shorter than that of the auxiliary contact element.

5. A current collection system for a travelling body according to claim 1, in which the pair of contactor supporting member are pivotally supported by the running body.

* * * * *